(12) United States Patent
Antchak et al.

(10) Patent No.: US 8,142,314 B2
(45) Date of Patent: Mar. 27, 2012

(54) TENSIONER FOR FLEXIBLE DRIVES

(75) Inventors: John R. Antchak, Aurora (CA); James W. Dell, Newmarket (CA); Gerald J. Hamers, Woodbridge (CA); Feng Liu, Oakville (CA)

(73) Assignee: Litens Automotive Partnership, Woodbridge (CA)

( * ) Notice: Subject to any disclaimer, the term of this patent is extended or adjusted under 35 U.S.C. 154(b) by 663 days.

(21) Appl. No.: 12/293,637

(22) PCT Filed: Dec. 19, 2006

(86) PCT No.: PCT/CA2006/002061
§ 371 (c)(1),
(2), (4) Date: Sep. 19, 2008

(87) PCT Pub. No.: WO2007/106971
PCT Pub. Date: Sep. 27, 2007

(65) Prior Publication Data
US 2010/0234155 A1 Sep. 16, 2010

(51) Int. Cl.
*F16H 7/12* (2006.01)
(52) U.S. Cl. .......................................... 474/135
(58) Field of Classification Search .................. 474/101, 474/109, 133, 135
See application file for complete search history.

(56) References Cited

U.S. PATENT DOCUMENTS

| | | | |
|---|---|---|---|
| 4,473,362 A | 9/1984 | Thomey et al. | |
| 4,689,037 A | 8/1987 | Bytzek | |
| 4,698,049 A | 10/1987 | Bytzek et al. | |
| 4,826,471 A | 5/1989 | Ushio | |
| 4,983,145 A | 1/1991 | Hirai et al. | |
| 5,011,460 A | 4/1991 | Ouchi et al. | |
| 5,083,983 A | 1/1992 | Hirai et al. | |
| 5,195,932 A | 3/1993 | Hirai et al. | |
| 5,312,302 A | 5/1994 | Yamamoto | |
| 5,352,160 A * | 10/1994 | Sakai et al. | 474/117 |
| 5,647,813 A | 7/1997 | Serkh | |
| 5,795,257 A * | 8/1998 | Giese et al. | 474/109 |
| 5,967,919 A | 10/1999 | Bakker | |
| 6,004,235 A | 12/1999 | Ohta et al. | |
| 6,059,679 A | 5/2000 | Tsutsui et al. | |
| 6,422,963 B2 | 7/2002 | Kurose | |
| 6,497,632 B2 | 12/2002 | Ayukawa et al. | |
| 6,575,860 B2 | 6/2003 | Dutil | |
| 7,004,863 B2 | 2/2006 | Serkh et al. | |
| 2003/0216204 A1* | 11/2003 | Serkh et al. | 474/135 |
| 2004/0014542 A1* | 1/2004 | Quintus | 474/135 |

(Continued)

FOREIGN PATENT DOCUMENTS

DE 102004047422 A1 4/2006

(Continued)

*Primary Examiner* — William E Dondero
(74) *Attorney, Agent, or Firm* — Miller Canfield

(57) ABSTRACT

A tensioner in accordance with the present invention employs a spindle and a tensioner arm which are preferably manufactured by a suitable manufacturing process, such as die casting, negating a requirement for machining operations. The biasing spring of the tensioner is wound with wire having a non-circular cross section to increase the spring force of the spring compared to a similar spring wound with wire of circular cross section and, as the tensioner arm is moved away from the flexible drive, the diameter of the biasing spring expands and the coils press a dampening shoe into contact with a wall of the tensioner arm producing a dampening force. The tensioner is simple to assemble and requires a relatively small package volume for the biasing force it can produce.

19 Claims, 8 Drawing Sheets

U.S. PATENT DOCUMENTS

| | | |
|---|---|---|
| 2004/0235598 A1 | 11/2004 | Kawasaki et al. |
| 2005/0096168 A1 | 5/2005 | Serkh et al. |

FOREIGN PATENT DOCUMENTS

| | | |
|---|---|---|
| EP | 0364277 B1 | 10/1989 |
| EP | 0425246 A1 | 5/1991 |
| EP | 0361899 B1 | 10/1993 |
| EP | 0536809 B1 | 12/1995 |
| EP | 0546825 B1 | 3/1997 |
| EP | 1398539 | 3/2004 |
| EP | 1640636 A2 | 3/2006 |
| JP | 2003120768 | 4/2003 |
| JP | 2003278864 | 10/2003 |
| JP | 2003322228 | 11/2003 |
| JP | 2004270824 | 9/2004 |
| JP | 2005076672 | 3/2005 |
| JP | 2005147304 | 6/2005 |
| JP | 2006029536 | 2/2006 |
| JP | 2006029537 | 2/2006 |
| WO | WO 03/098071 A1 | 11/2003 |
| WO | WO 2004/033 933 A1 | 4/2004 |
| WO | WO 2005/064201 | 7/2005 |

\* cited by examiner

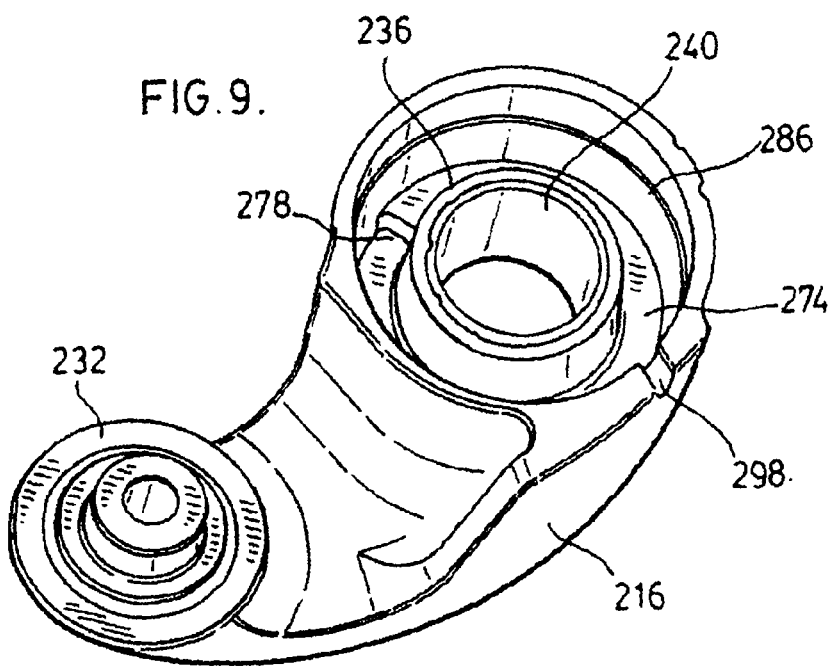
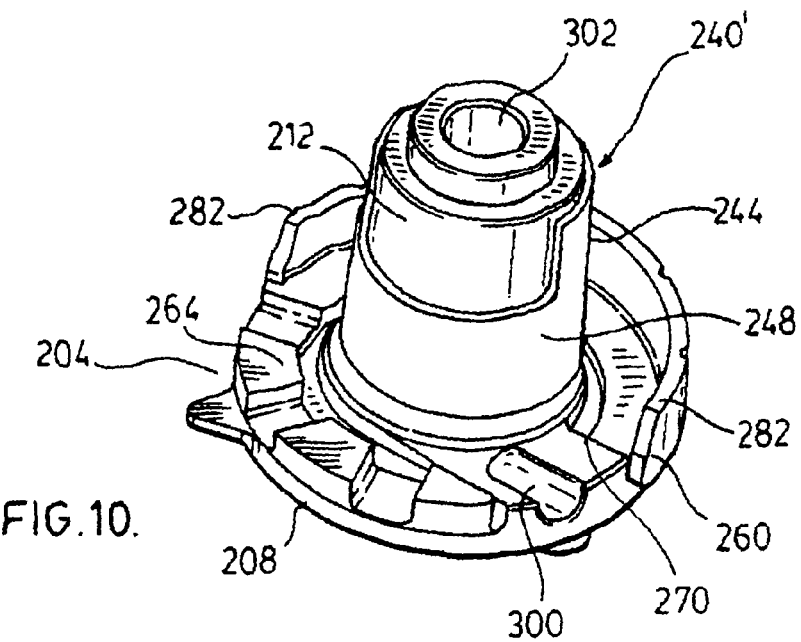

TENSIONER FOR FLEXIBLE DRIVES

FIELD OF THE INVENTION

The present invention relates to tensioners for flexible drives. More specifically, the present invention relates to tensioners with a reduced package volume, reduced manufacturing costs and/or simplified assembly.

BACKGROUND OF THE INVENTION

Tensioners for flexible drive systems, and in particular for flexible drive systems comprising accessory drive systems on internal combustion engines, are well known. Such tensioners include a pulley which is biased toward the flexible drive, typically a rubber belt. The pulley is mounted to an arm which is biased towards the flexible drive (the tensioning direction) by a spring and the arm can also include means to produce a dampening force to inhibit oscillation of the arm and/or flexible drive.

While such tensioners are well known, they suffer from disadvantages in that they can be relatively large, requiring significant available mounting volume (package volume) on the engine or other device on which they are installed.

Further, while dampening the movement of the tensioner arm away from the flexible drive (the de-tensioning direction) to reduce oscillation is desired, dampening movement of the tensioner arm toward the flexible drive (the tensioning direction) inhibits the ability of the tensioner to maintain tension in the flexible drive and thus is undesired.

Also, prior art tensioners which provide frictional dampening typically provide a substantially constant frictional force, independent of the amount of displacement of the tensioner arm. In contrast, it is desired that the frictional dampening force increase as the tensioner arm is moved away from the flexible drive (the de-tensioning direction), rather than being a constant force.

Further still, the manufacture and assembly of conventional tensioners can be involved, requiring machining operations on some parts and special assembly tools with multiple assembly steps, increasing the manufacturing expense of the tensioners.

It is desired to have a tensioner which can provide relatively high tensioning forces while requiring a relatively small package volume and which can be relatively easily manufactured and assembled.

SUMMARY OF THE INVENTION

It is an object of the present invention to provide a novel tensioner for a flexible drive which obviates or mitigates at least one disadvantage of the prior art.

According to a first aspect of the present invention, there is provided a tensioner for tensioning a flexible drive. The tensioner has a spindle and a tensioner arm. The spindle has a base is configured for mounting on a surface of an engine. The tensioner arm is mounted on the spindle for rotatable movement about a first axis. The tensioner arm has a pulley rotatably mounted about a second axis, the first axis being spaced from and parallel to the second axis. A biasing coil spring acts between the spindle and the tensioning arm urging the tensioner arm to rotate about the first axis in a tensioning direction and bias the tensioner arm and the pulley into tensioning, engagement with a flexible drive. A bushing is mounted between the tensioner arm and spindle to allow the tensioner arm to pivot about the spindle and provide a first frictional force dampening movement of the tensioner arm about the spindle. A dampening shoe is mounted between the spring and the tensioner arm. The dampening shoe is urged into and out of frictionally engagement with the tensioner arm when coils of the spring expand and contract, respectively providing a varying second frictional force. The first frictional force and the second frictional force sum together and provide a tensioner with variable damping.

Preferably, the tensioner arm is die cast and includes a cast inclined portion to receive the end surface of the biasing spring and also includes a cast stop against which the end of the biasing spring abuts. Also preferably, the spindle is die cast and includes a cast stop against which the end of the biasing spring abuts. Also preferably, the dampening shoe includes a molded inclined portion to receive the helical surface of the biasing spring. Also preferably, the frictional force provided by the dampening shoe increases as the tensioner arm is moved from the first position. Also preferably, the frictional force rapidly diminishes as the tensioner arm returns to the first position.

The present invention provides a tensioner which employs a spindle and a tensioner arm which are preferably manufactured by die casting or similar manufacturing techniques, negating a requirement for machining operations. The biasing spring of the tensioner preferably includes coils formed from wire having a non-circular cross section to increase the spring force of the spring compared to a similar spring with coils of wire having a circular cross section. As the tensioner arm and pulley are moved in the de-tensioning direction, away from the flexible drive, the diameter of the spring expands and the coils press at least a portion of a dampening shoe into contact with a wall of the tensioner arm producing a dampening force.

The tensioner is simple to assemble and requires a relatively small package volume for the biasing forces and dampening forces it can produce.

BRIEF DESCRIPTION OF THE DRAWINGS

Preferred embodiments of the present invention will now be described, by way of example only, with reference to the attached Figures, wherein:

FIG. 9 shows a bottom and side perspective view of a tensioner arm and a bushing of the tensioner of FIG. 7;

FIG. 10 shows a top and side perspective view of a spindle, the bushing and a dampening shoe of the tensioner of FIG. 7;

DETAILED DESCRIPTION OF THE INVENTION

Figure 1:
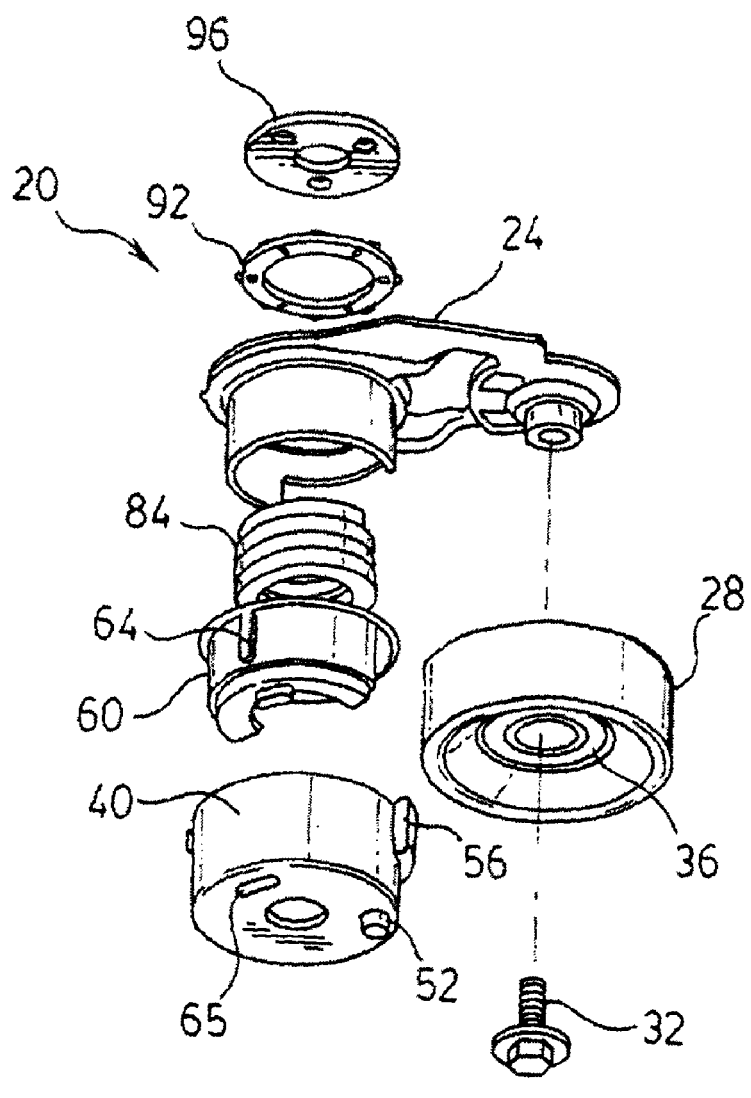
FIG. 1 is an exploded view showing the bottom and side of a tensioner in accordance with the present invention.
Figure 2:
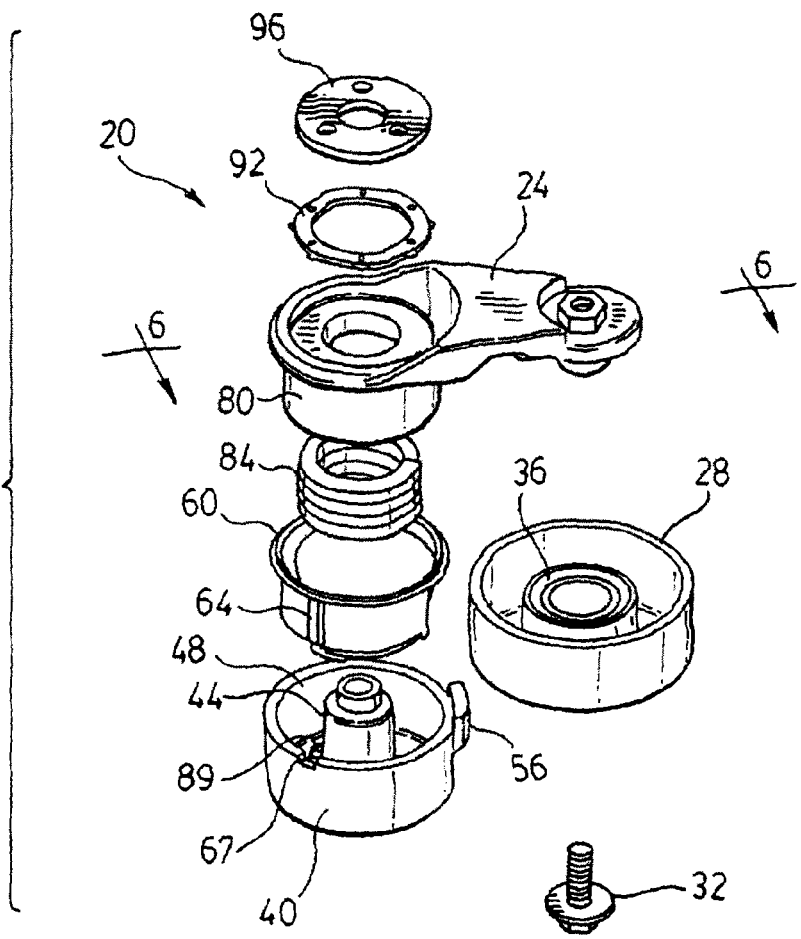
FIG. 2 is an exploded view showing the top and side of the tensioner of FIG. 1.

A tensioner for a flexible drive, in accordance with the present invention, is indicated generally at 20 in FIGS. 1, 2 and 6. Tensioner 20 comprises a tensioner arm 24 to which a pulley 28 is rotatably mounted via a bolt 32 and a bearing 36, defining a first axis of rotation. Bolt 32 engages a threaded fastener 33 formed in or attached to the tensioner arm 24 at one end thereof. Bearing 36 can be integrally formed in pulley 28 or can be a separate bearing installed on pulley 28. Pulley 28 can be designed to tension an endless rubber belt, either smooth or toothed, a chain or other flexible endless drive.

Figure 6:
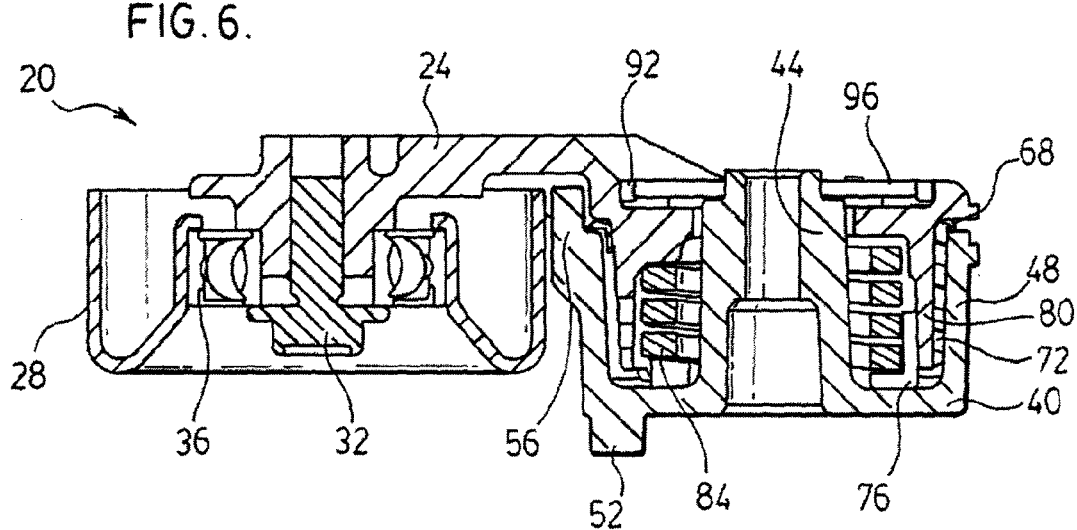
FIG. 6 is a cross section taken along line 6-6 of FIG. 1.

Tensioner 20 further includes a conical spindle 44 having a base comprising a spindle cup 40 and an outer radial wall 48, which is preferably somewhat conical in shape, as best seen in FIG. 6. Spindle cup 40 can include one or more index features or protrusions 52 on the outer bottom or mounting surface which engage complementary features on the engine or other surface to which tensioner 20 is mounted to ensure the correct orientation of tensioner 20 with respect to the flexible endless drive to be tensioned. Spindle cup 40 can further include one or more stops or protrusions 56 which is received within recess 57 of tensioner arm 24, limiting travel of tensioner arm 24 relative to the spindle 44 to between 30° and 60°, with 40° being most preferable.

Figure 3:
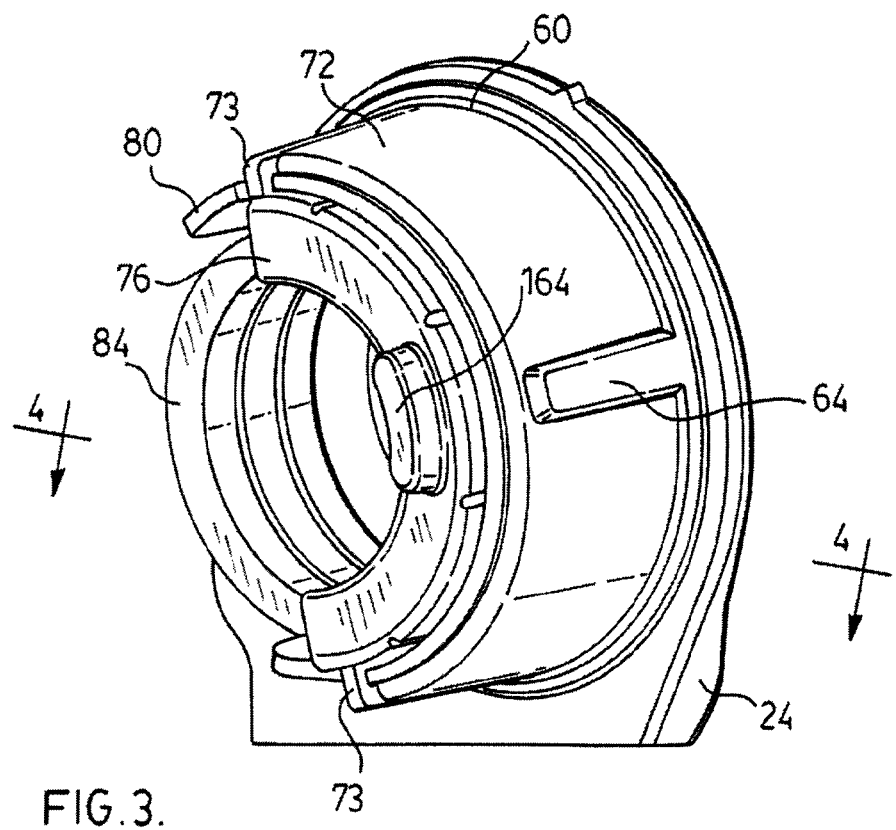
FIG. 3 is a side perspective view showing a portion of a tensioner arm, biasing spring and bushing of the tensioner of FIG. 1.
Figure 4:
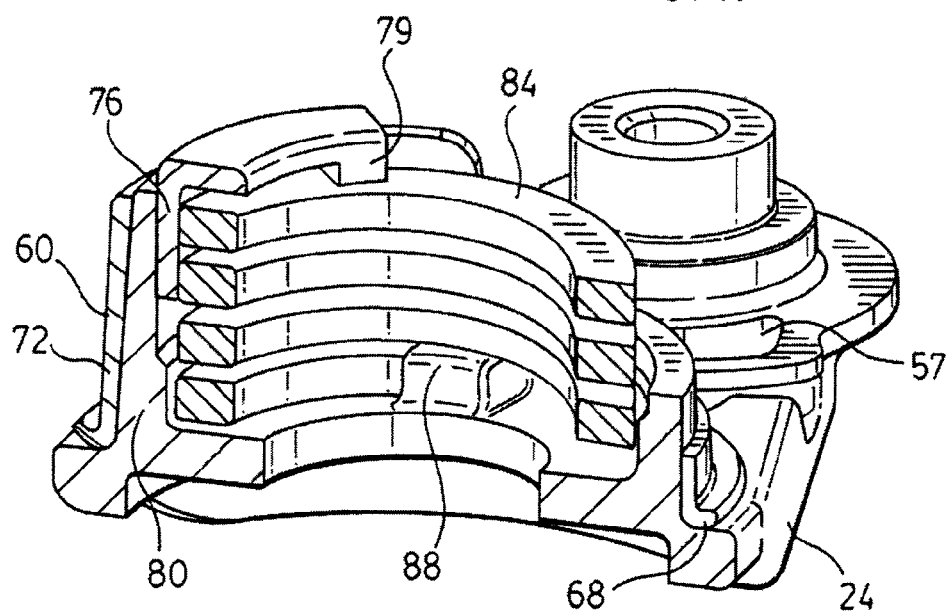
FIG. 4 is cross section taken through line 4-4 of FIG. 3.
Figure 5:
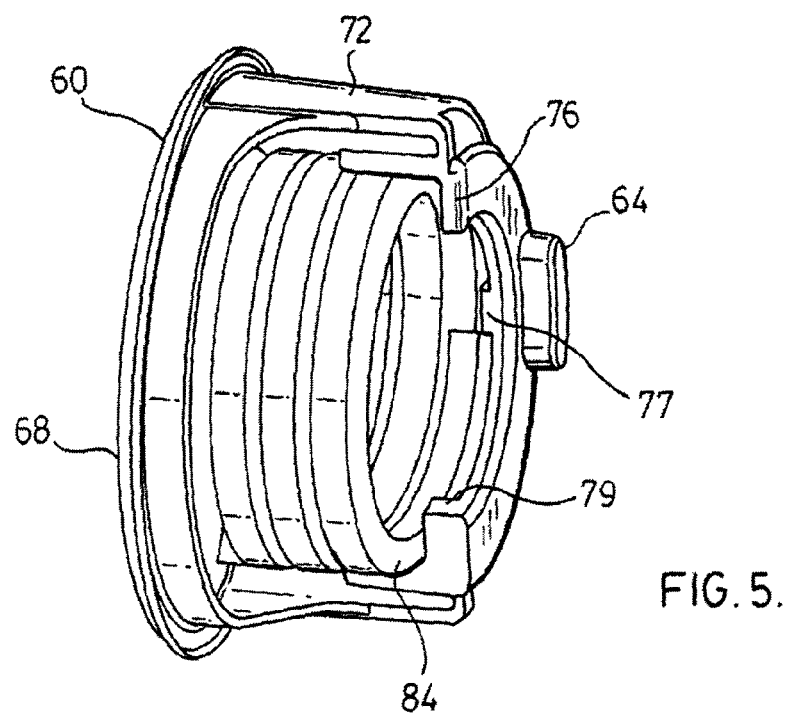
FIG. 5 is a side perspective view of an assembly of the biasing spring and bushing of the tensioner of FIG. 1.

Spindle cup 40 nestingly receives a bushing 60, best seen in FIGS. 3, 4 and 5. Bushing 60 includes at least one index feature or protrusion 64 which engages a complementary index feature or recess 67 in wall 48 of spindle cup 40 to prevent rotation of bushing 60 with respect to spindle cup 40.

As illustrated, bushing 60 includes an annular lip 68, a somewhat conical radial wall 72 and a dampening structure, in this embodiment a dampening shoe or ring 76, located radially inwardly from radial wall 80. Bushing 60 can be fabricated from any suitable low friction, wear resistant organic resinous material, such as Nylon 4/6 (such as Stanyl TW363) and can be formed by injection molding or any other suitable manufacturing process. The coefficient of friction of the bushing 60 can be modified as desired by adding filler materials such as glass, graphite or by adding lubricants such as PTFE resins, dry lubricants, etc.

Annular lip 68 of bushing 60 is sized to extend over the upper edge of the spindle cup 40. Radial wall 72 is the friction surface between the tensioner arm 24 and the spindle 44. Radial wall 72 is asymmetrical and does not extend completely about annular lip 68. Preferably, radial wall 72 extends arcuately having an arc length of about a half circle.

Dampening shoe 76 is flexibly attached to wall 72 by spaced radial tabs 73 which simplifies manufacturing of the dampening shoe 76 and wall 72 in a single mold cavity. Dampening shoe 76 has a series of tabs 77 and 79 on the inner surface that collectively presents a spiral or helical surface for receiving the first coil of the coil spring 84. The end axial surface of the shoe 76 has an indexing protrusion 164 and is inserted into aperture 65 on the bottom surface of the spindle cup 40. Preferably dampening shoe 76 is asymmetrical and does not extend completely about annular lip 68. Preferably, the friction surface of dampening shoe 76 extends arcuately having a maximum arc length of about a half circle. By limiting the maximum arc length, the dampening shoe 76 generates frictional dampening forces rather than acting as a clutch.

Bushing 60 and dampening shoe 76 are positioned relative to the tensioning arm 24 and the biasing spring 84 such that both the hubload force vector and the reactionary spring force vector are directed in the same direction through the bushing and dampening shoe 76. The reactionary spring force vector acts in a direction of about 90° from the spring stop, abutment feature 89 on the spindle 44.

As best seen in FIGS. 2, 3 and 5, tensioner arm 24 includes at an opposite end, a hub 80, defining a second axis of rotation, preferably having a complementary conical shape to that of outer radial wall 48, which extends orthogonally to the long axis of arm 24. The first axis of rotation is spaced from and parallel to the second axis of rotation. Hub 80 is received within radial wall 72 of bushing 60 when tensioner 20 is assembled. While the illustrated embodiment has a generally conical hub 80 and radial outer wall 48, the present invention is not limited to conical shapes and can also include cylindrical shapes.

Tensioner 20 includes a biasing spring 84 which surrounds spindle 44 and acts between spindle cup 40 and tensioner arm 24 to bias tensioner arm 24, and pulley 28, into tensioning engagement with the flexible drive tensioned by tensioner 20. Preferably, spring 84 is formed of wire coils with a non-round cross-section, preferably rectangular, and has flat ends. Tensioner arm 24 includes an abutment feature 88 extending radially inwardly that receives one end of spring 84 and supports the helical or spiral surface of the next adjacent coil of the spring 84 in an inclined manner. Spindle cup 40 also includes an abutment feature 89 on the inner bottom surface that receives the opposite end of spring 84 to transfer the bias force from spring 84 to tensioner arm 24 and spindle cup 40.

The helical or spiral surfaces that support the biasing spring 84 enables the biasing spring 84 to expand and contract radially while maintaining general axial alignment of the coils of the biasing spring 84. The coils of the biasing spring 84 will expand and contract uniformly to engage and disengage the bushing 60 and dampening shoe 76. Uniform expansion and contraction minimizes uneven contact and wear of the bushing 60 and/or the dampening shoe 76.

Tensioner 20 further includes a thrust washer 92 and a front plate 96 which are assembled, as shown in FIGS. 1 and 2 with spindle 44 being staked to front plate 96 to retain tensioner arm 24 on spindle 44. To mount tensioner 20 to an engine or other device, a bolt can be inserted through the center bore in spindle 44, thrust washer 92 and front plate 96.

When tensioner arm 24 is subjected to a load, by the flexible drive it is tensioning, the outer surface of hub 80 rides on the inner surface of radial wall 72 of bushing 60, transferring the load, i.e. the hubload vector, to spindle cup 40. The relatively large surface areas of hub 80 and radial wall 72 allow for relatively large loads to be transferred from tensioner arm 24 to spindle cup 40 while avoiding undue wear on the components of tensioner 20.

Further, by appropriately selecting the material from which bushing 60 is fabricated, the coefficient of the frictional force created between tensioner arm 24 and spindle cup 40 can be selected and this frictional force acts as a desirable dampening force in the operation of tensioner 20.

In addition to the dampening force created between hub 80 and radial wall 72, dampening shoe 76 of bushing 60 can dimensioned radially and circumferentially to generate a desired dampening force between tensioner arm 24 and spindle cup 40.

When tensioner arm 24 is moved in the de-tensioning direction (away from the flexible drive it is tensioning), spring 84 resists the movement of tensioner arm 24 by unwinding and the coils of spring 84 expand radially outwardly and press against dampening shoe 76. The resulting force exerted by the coils of spring 84 on dampening shoe 76 biases dampening shoe 76 into greater frictional contact with the inner surface of hub 80 thus squeezing hub 80 between radial wall 72 and dampening shoe 76.

This squeezing action adds another component of frictional force inhibiting movement of tensioner arm 24 in the de-tensioning direction, further dampening movement of tensioner arm 24, and this frictional force varies with the expansion of the coils of spring 84, thus varying dependent upon the amount of rotation of tensioner arm 24. In other words, the frictional force increases as the tensioner arm 24 moves further in the de-tensioning direction and thereby limiting movement of the tensioner arm 24.

Further, as tensioner arm 24 moves in the tensioning direction (to return to its original position) the radius of the coils of spring 84 decreases, reducing the above-mentioned squeezing action such that the resulting frictional force has a different characteristic than that experienced by tensioner arm 24 when moving in the de-tensioning direction.

As is apparent to those skilled in the art, the tensioner of the present invention can be tailored and tuned to meet the demands of any engine configuration.

Figure 7:
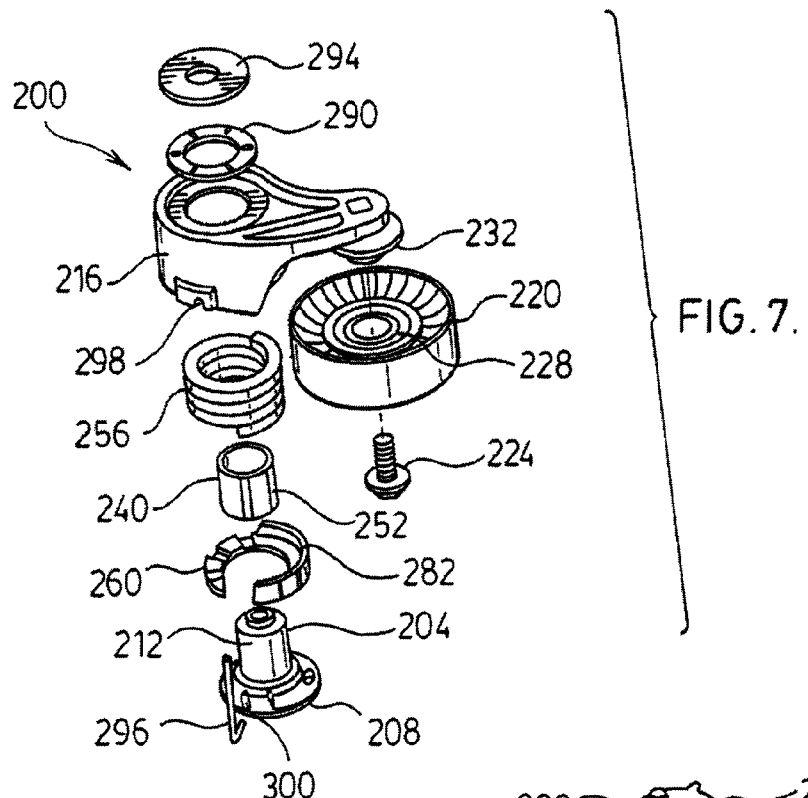
FIG. 7 is an exploded view showing the top and side of another tensioner in accordance with the present invention.
Figure 8:
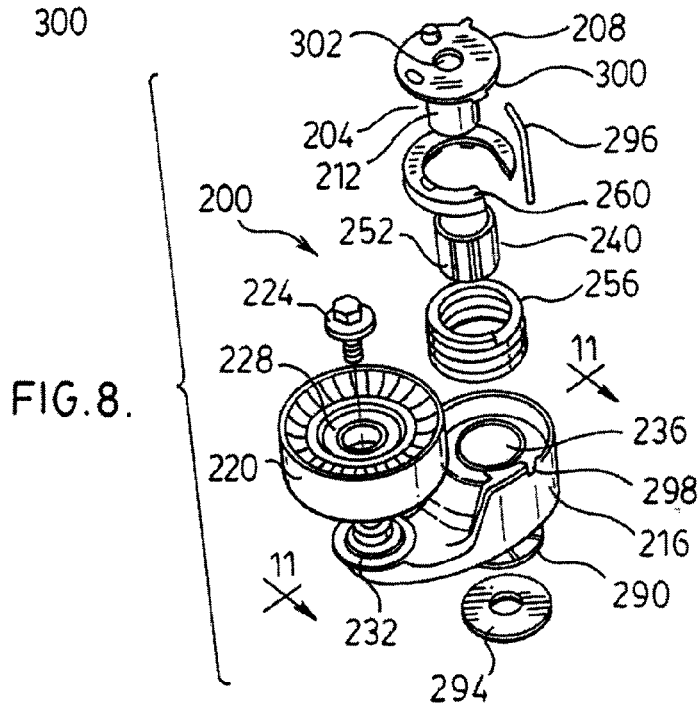
FIG. 8 is an exploded view showing the bottom and side of the tensioner of FIG. 7.
Figure 11:
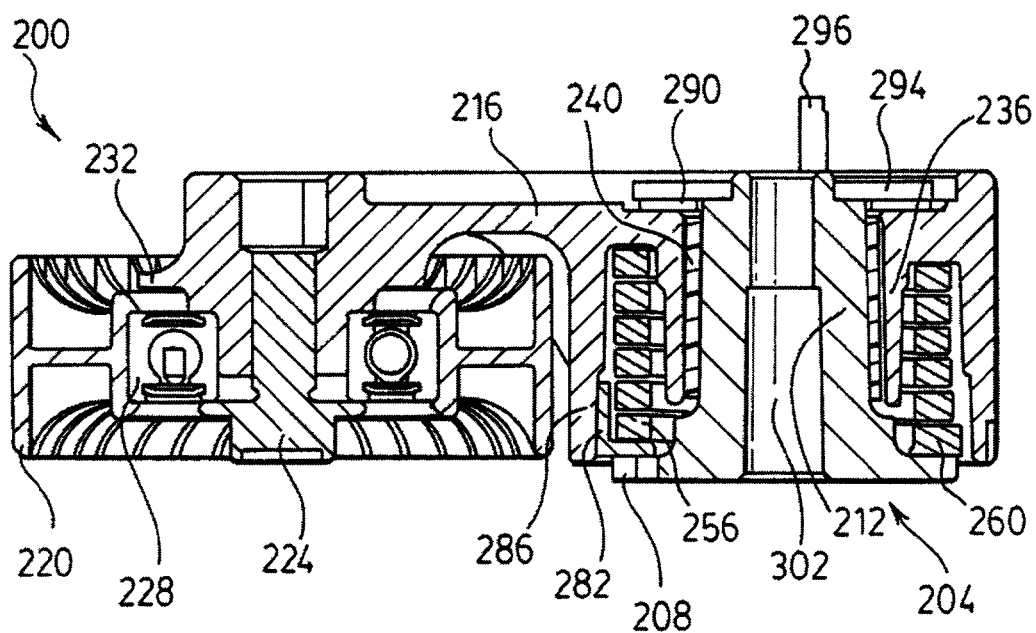
FIG. 11 shows a cross section of the assembled tensioner taken along line 11-11 of FIG. 8.

Another tensioner for a flexible endless drive is indicated generally at 200 in FIGS. 7, 8 and 11. Tensioner 200 includes a spindle 204 with a base 208 that can engage a surface of an internal combustion engine or other device on which the flexible drive to be tensioned is located. Base 208 can include a tang or other indexing feature to permit tensioner 200 to be installed at a predefined orientation at its installation site.

Spindle 204 has a bearing surface 212. In a present embodiment of the invention, bearing surface 212 is generally conical in shape but the present invention is no so limited and cylindrical-shaped posts can also be used. Spindle 204 can be formed by die casting, or other suitable manufacturing process, from a suitable material such as aluminum, which should not require further machining operations.

Tensioner 200 also includes a tensioner arm 216 to which a pulley 220 is rotatably affixed at one end thereof by a bolt 224. Pulley 220 rotates about a second axis. Pulley 220 can be designed to engage a flexible drive such as a rubber belt, either toothed or smooth, or a chain. Pulley 220 includes a bearing 228, which can be integrally formed in pulley 220 or which can be press fit or otherwise mounted to pulley 220, and which abuts against a bearing face 232 of tensioner arm 216 to allow pulley 220 to rotate freely with respect to tensioner arm 216. Preferably, tensioner arm 216 is also formed by die casting, or other suitable manufacturing process, from aluminum or other suitable materials and thus should not require any further machining operations.

Tensioner arm 216 further includes a conical hub 236. Hub 236 receives a conical bushing 240 which acts between hub 236 and bearing surface 212 to allow tensioner arm 216 to pivot about post 212 about a first axis. The first axis is parallel to and spaced from the second axis of rotation.

Bushing 240, which can be best seen in FIG. 10, can be fabricated from any suitable low friction, wear resistant material, such as Nylon 4/6 (such as Stanyl TW363) and can be formed by injection molding or any other suitable manufacturing process. The coefficient of friction of the bushing 240 can be modified as desired by adding filler materials such as glass, graphite or by adding lubricants such as PTFE resins, dry lubricants, etc.

The bushing 240 is either symmetrical (collar shaped as shown in FIGS. 7 and 8) or asymmetrical as shown in FIG. 10. In either embodiment, undesired frictional drag between hub 236 and post 212 is reduced by having an axial extending spline-like bushing surface 244 over the portion of post 212 where the hubload vector is directed, i.e. where the load is expected to be applied from tensioner arm 216, and by having a recessed, or cut out, surface 248 over the non-load (or reduced load) bearing portion of post 212. In the illustrated embodiment, the cut out surface 248 extends circumferentially about half.

Bushing surface 244 can include one or more outer axial grooves 252 to assist in removal of water or foreign material from between hub 236 and bearing surface 248 and/or to allow tuning of the frictional force between hub 236 and post 212.

A biasing spring 256 surrounds post 212 and acts between spindle 204 and tensioner arm 216 to bias tensioner arm 216, and pulley 220, into tensioning engagement with the flexible drive tensioned by tensioner 200. Preferably, spring 256 is formed of wire coils with a non-round, preferably rectangular, cross-section. As is known to those of skill in the art, springs formed with coils of non-round cross section result in springs which produce a greater spring force than similar sized springs formed with coils of round cross sections, thus reducing the required overall package volume for tensioner 200, for a given biasing force, compared to a tensioner with round cross section coils.

As discussed above, it is desired to provide some dampening between spindle 204 and tensioner arm 216 to achieve the desired operation of tensioner 200. Accordingly, a dampening structure, in this embodiment dampening shoe 260, is provided in tensioner 200. Dampening shoe 260 can be fabricated from any suitable low friction, wear resistant organic based material, such as Nylon 4/6 (such as Stanyl TW363) and can be formed by injection molding or any other suitable manufacturing process.

Dampening shoe 260 is located about post 212 against base 208. Preferably, dampening shoe 260 includes an inclined or spiral surface 264 to receive spring 256. Base 208 includes a stop 270 at the end of inclined surface 264 against which one end of spring 256 abuts. Similarly, tensioner arm 216 includes an inclined or spiral surface 274 to receive spring 256. Inclined surface 274 includes a stop 278 against which one end of spring 256 abuts.

By providing inclined or spiral surfaces 264 and 274, it is not necessary to perform machining operations on spring 256 to flatten the top and bottom of spring 256. If desired however, the present invention can also omit these inclined surfaces and utilize a spring 256 which has had a machining operation, such as grinding, performed on its uppermost and bottommost coils to flatten their surfaces. Alternatively, inclined surfaces 264 and 274 can be omitted and spring 256 used without machining its end surfaces flat, however this is less preferred as the desired contact with the dampening shoe, described below, may not be achieved due to the resulting tilting of spring 256.

Similarly, by providing stops 270 and 278, it is not necessary to perform manufacturing operations to form tangs at the ends of spring 256 thus potentially avoiding another machining operation, although such an additional machining operation can be performed if desired.

As inclined surfaces 264 and 274 and stops 270 and 278 are formed during the die casting (or other suitable manufacturing process) of spindle 204 and the die casting (or other suitable manufacturing process) of tensioner arm 216 and during the molding of dampening shoe 260, no additional manufacturing expense is incurred in their provision apart from the incremental expense of the initial fabrication of the dies and/or molds, etc.

As pulley 220 and tensioner arm 216 are moved in the de-tensioning direction, away from the flexible drive and against the biasing force of spring 256, the diameter of the coils of spring 256 increase. This increase causes the coils to press against an upstanding dampening shoe wall 282 of dampening shoe 260 which is urged against the friction surface of inner wall 286 of tensioner arm 216. The squeezing and sliding of dampening shoe wall 282 between the outer surface of the coils of spring 256 and inner wall 286 creates a variable frictional force which dampens the movement of tensioner arm 216 against the biasing force of spring 256.

As will be apparent to those of skill in the art, as tensioner arm 216 is moved in the tensioning direction, toward the flexible drive, the diameter of the coils of spring 256 decrease, allowing wall 282 of dampening shoe 260 to disengage wall 286 of tensioner arm 216, reducing, and eventually substantially removing, the dampening force.

Thus, dampening shoe 260 and spring 256 provide an asymmetric dampening force greater in the de-tensioning direction than in the tensioning direction, which is preferred for operation of a tensioner. Further, the dampening force increases, as tensioner arm 216 moves to a greater extent, thus providing a position-dependent dampening force.

In addition to the cost savings available due to the avoidance of additional machining steps, one of the other perceived advantages of the present invention is the ease with which tensioner 200 can be assembled. First, dampening shoe 260 is placed on spindle base 208, bushing 240 is installed over post 212. Next, spring 256 is installed against inclined surface 264 and stop 270. Then tensioner arm 216 is installed over spring 256 and the end of spring 256 is located against stop 278. Finally, a thrust washer 290 and a front plate 294 are located on the top of tensioner arm 216 on spindle 204 and spindle 204 is staked to front plate 294. Pulley 220 can then be mounted to bearing face 232 via bolt 224 and assembly of tensioner 200 is complete. Tensioner 200 is installed on an engine or other device with a bolt (not shown) that is inserted through a central bore 302 in post 212.

As most tensioners are required to be in a partially preloaded state when being installed, during assembly spindle 204 can be held while tensioner arm 216 is pivoted to a desired installation position and then a "grenade pin" 296, or other suitable device, can be inserted through a notch or bore 298 in tensioner arm 216 to engage a bore or groove 300 in spindle 204 to maintain tensioner 200 in the pre-loaded installation state until grenade pin 296 is subsequently removed. If it is not required to provide tensioner 200 in a pre-wound state, grenade pin 296 can be omitted.

Tensioner 200 employs a spindle 204 and a tensioner arm 216 which are preferably manufactured by die casting, or other suitable manufacturing processes, negating a requirement for machining operations. Biasing spring 256 is preferably wound with wire coils having a non-circular cross section to increase the spring force of spring 256 compared to a similar spring wound with wire of circular cross section. As tensioner arm 216 is moved in the de-tensioning direction, away from the flexible drive, the diameter of the coils of spring 256 expands and the coils press a portion of dampening shoe 260 into contact with wall 286 of tensioner arm 216 producing a dampening force. Tensioner 200 is simple to assemble and requires a relatively small package volume for the biasing force it can produce.

As should now be apparent, each of tensioners 20 and 200 provide frictional dampening of movement of tensioner arms 24 and 216 respectively and a component of the frictional dampening force is variable, depending upon the degree to which the respective tensioner arm has been rotated beyond an initial position. This variable component is created when the expanding coils of the biasing spring abut a bearing structure which is then subjected to an increased normal force, resulting in a commensurate increase in its frictional force. Further, the dampening force is not symmetric, increasing with a first characteristic as the tensioner arm is moved in the de-tensioning direction, away from the flexible drive, and decreasing with a second characteristic as the tensioner arm returns in the tensioning direction to its initial position.

Tensioner 200 includes bearing 240 within the coils of its biasing spring 256, while tensioner 20 includes a bushing 60 surrounding the coils of its respective biasing spring 84. While tensioner 200 allows for a somewhat more compact design, reducing the packaging volume required for tensioner 200, the greater bearing contact areas of tensioner 20 allow for greater loads to handled by tensioner 20, thus making tensioner 20 very suitable for high load applications such as synchronous drives in internal combustion engines, in addition to accessory drive systems in such engines.

It is also contemplated that tensioner arms 24 or 216, or other components of tensioners 20 or 200, can be treated to enhance their thermal transfer capabilities, if desired. For example, a coating, such as the thermal dispersant coating sold by Tech Line Coatings, Inc. of Murrieta Calif. under the brand name TLTD, can be applied to the point where bearings 36 or 228 mount to their respective tensioner arms 24 or 216 to enhance the thermal transfer capabilities to remove waste heat from bearings 36 or 228. Similarly, the area of tensioner arms 24 or 216 adjacent bushings 60 or 240 can be similarly treated to enhance the removal of waste heat created by the frictional dampening forces at the respective bushings. It is contemplated that, if tensioner arms 24 or 216 are manufactured from an engineering plastic, such thermal dispersant coatings will be particularly advantageous.

Figure 12:
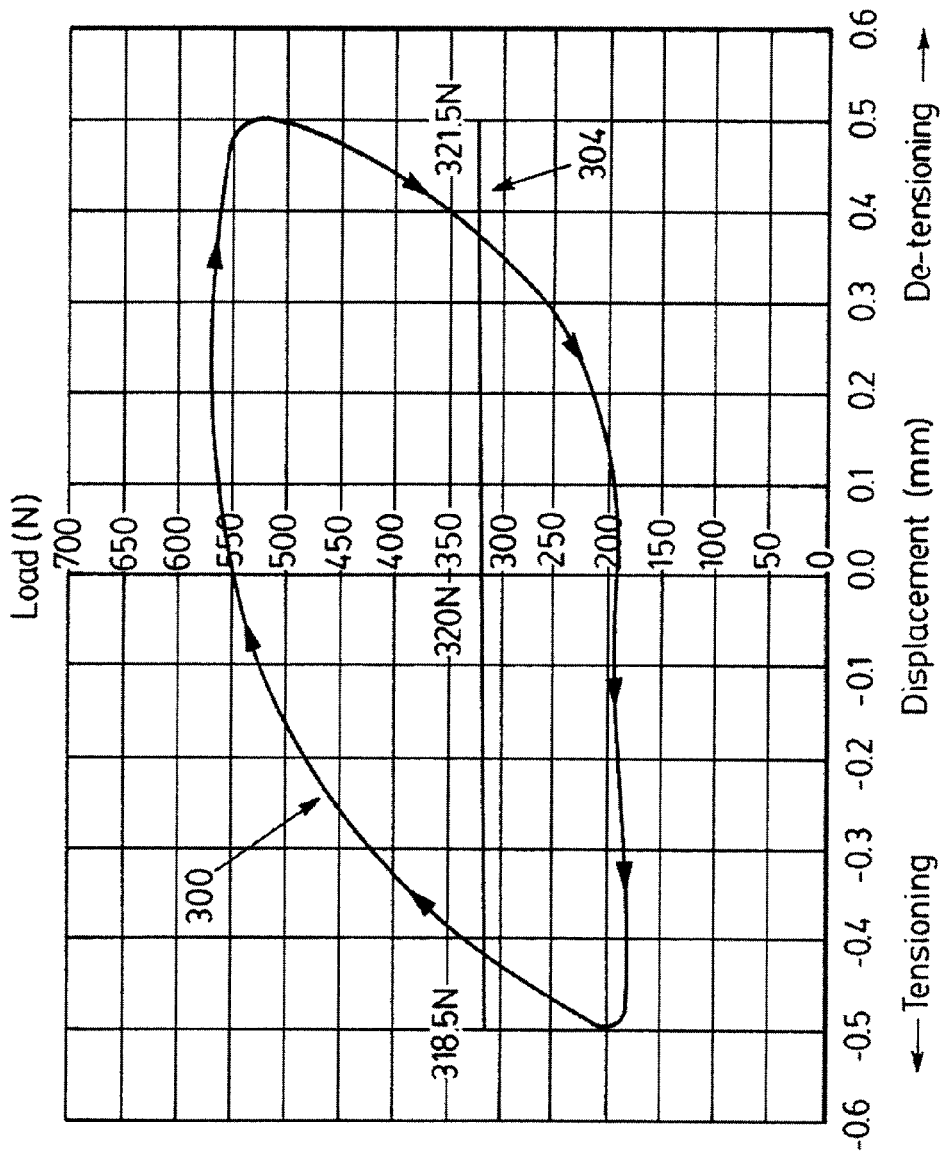
FIG. 12 shows a plot of the force on the tensioner arm of FIG. 1 versus the displacement of the tensioner arm.

FIG. 12 shows an example of the asymmetry of the dampening force which can be obtained with tensioners 20 or 200. In the illustrated test case, a tensioner 20 with a tensioner arm 24 having a length one hundred millimeters between the center of spindle 44 and bolt 32, was placed in a test rig. A force was then applied at bolt 32, in a direction substantially orthogonally to the length of tensioner arm 24, and the applied force was plotted against the measured displacement of the tensioner arm.

As can be seen, the resulting force versus displacement plot is in the form of a hysteresis curve 300, demonstrating the asymmetric dampening that can be achieved. Specifically, when the tensioner is displaced from about 0.5 mm in the tensioning direction to about 0.5 mm in the de-tensioning direction (where 0.0. mm is an arbitrarily selected nominal midpoint for the tensioner's range of movement), the force generated rapidly rises from about two hundred Newtons to about five hundred and fifty Newtons, following the upper part of curve 300. As can be seen, on this part of the curve the dampening force rises almost linearly with the displacement until about five hundred and fifty Newtons at the midpoint (0.0 mm), after which it is substantially constant.

Conversely, when the tensioner is returned to the 0.5 mm initial position in the tensioning direction, following the bottom part of curve 300, the force on tensioner arm 24 rapidly drops almost linearly from about five hundred and fifty Newtons to about two hundred Newtons at the midpoint (0.0 mm), after which it is substantially constant.

For comparison purposes, plot line 304 shows a plot of the force versus displacement curve for tensioner 20 when the variable dampening features (namely dampening shoe 76) are removed. As can be seen, over the same range of movement, the force generated by the tensioner arm 24 between the same two extremes for undampened version of tensioner 24 ranges between three hundred and eighteen point five Newtons to three hundred and twenty one point five Newtons, i.e.—it is substantially constant.

The present invention provides a tensioner for flexible drives, such as accessory drive systems or belt or chain synchronous drive systems on internal combustion engines. The tensioners are compact and are relatively economical to manufacture and assemble. In addition, the tensioners provide a dampening force to the tensioner arm which force is at least partially dependent upon the extent to which the tensioner arm has been rotated from an initial position, increasing the dampening force as the tensioner arm is moved further from the initial position. Further, the tensioners can provide an asymmetric dampening force, providing a relatively large dampening force when the tensioner initially moves in the de-tensioning direction, and providing a rapidly decreasing dampening force when the tensioner changes direction of travel and then moves in the tensioning direction.

The above-described embodiments of the invention are intended to be examples of the present invention and alterations and modifications may be effected thereto, by those of skill in the art, without departing from the scope of the invention which is defined solely by the claims appended hereto.

We claim:

1. A tensioner for tensioning a flexible drive, comprising:
  a spindle having a base, said base configured for mounting on a surface of an engine;
  a tensioner arm mounted on said spindle for rotatable movement about a first axis, said tensioner arm having a pulley rotatably mounted about a second axis, said second axis being spaced from and parallel to said first axis;
  a coil spring acting between the spindle and the tensioning arm urging the tensioner arm to rotate about said first axis in a tensioning direction and bias the tensioner arm and the pulley into tensioning engagement with a flexible drive;
  a bushing mounted between the tensioner arm and spindle to allow the tensioner arm to pivot about the spindle and provide a first frictional force dampening movement of said tensioner arm about said spindle;
  a dampening shoe mounted between the coil spring and the tensioner arm, wherein said coil spring expands radially as the tensioner arm is urged in a direction opposite the tensioning direction, and coils of the spring press the dampening shoe into greater frictional engagement with the tensioner arm as the coil spring expands radially and relieve the frictional engagement with the tensioner arm as the coil spring contracts radially thereby providing a varying second frictional force dampening movement of said tensioner arm about said spindle.

2. The tensioner of claim 1, wherein one of said tensioner arm and said spindle has a cup structure surrounding said coil spring.

3. The tensioner of claim 2, wherein said tensioner arm has a hub and said bushing is nested between said hub and said spindle.

4. The tensioner of claim 3, wherein said spindle has a first abutment engaging an end of said coil spring and said tensioner arm has a second abutment engaging an opposite end of said coil spring, said dampening shoe being positioned 90° relative to said first abutment to receive a reactionary force generated by said coil spring.

5. The tensioner of claim 4, wherein said first abutment supports said coil spring maintaining general axial alignment of said coil spring as said tensioner arm rotates relative to said spindle about said first axis.

6. The tensioner of claim 5, wherein said shoe supports said coil spring maintaining general axial alignment of said coil spring as said tensioner arm rotates relative to said spindle about said first axis.

7. The tensioner of claim 6, wherein said dampening shoe and said first abutment helically support a respective end coil of said coil spring.

8. The tensioner of claim 7, wherein said spindle has said cup structure and said hub surrounds said coil spring.

9. The tensioner of claim 7, wherein said tensioner arm has said cup structure and said coil spring surrounds said hub.

10. The tensioner of claim 3, wherein dampening shoe is asymmetrically shaped having an arcuate shoe friction surface and said dampening shoe is fixed relative to said spindle whereby a reactive spring force is directed through said shoe friction surface.

11. The tensioner of claim 10, wherein said bushing is asymmetrically shaped having an arcuate bushing friction surface and said dampening shoe is fixed relative to said spindle whereby a reactive hubload force is directed through said bushing friction surface.

12. The tensioner of claim 11, wherein said spindle has said cup structure and said hub surrounds said coil spring.

13. The tensioner of claim 12, wherein said tensioner arm has said cup structure and said coil spring surrounds said hub.

14. The tensioner of claim 11, wherein said hub, said bushing and said spindle are tapered.

15. The tensioner of claim 1, wherein said coil spring is formed from wire having a rectangular cross-section.

16. The tensioner of claim 15, wherein said tensioner arm is die cast.

17. The tensioner of claim 15, wherein bushing and said shoe are formed of low friction, wear resistant material.

18. The tensioner of claim 17, wherein said low friction, wear resistant material is NYLON 4/6.

19. The tensioner of claim 15, further comprising a pin extending between said tensioner arm and said spindle to maintain a predetermined orientation for shipping said tensioner, said pin being removable after the tensioner has been installed and said pulley engages said flexible drive.

* * * * *